United States Patent Office 3,283,586
Patented Nov. 8, 1966

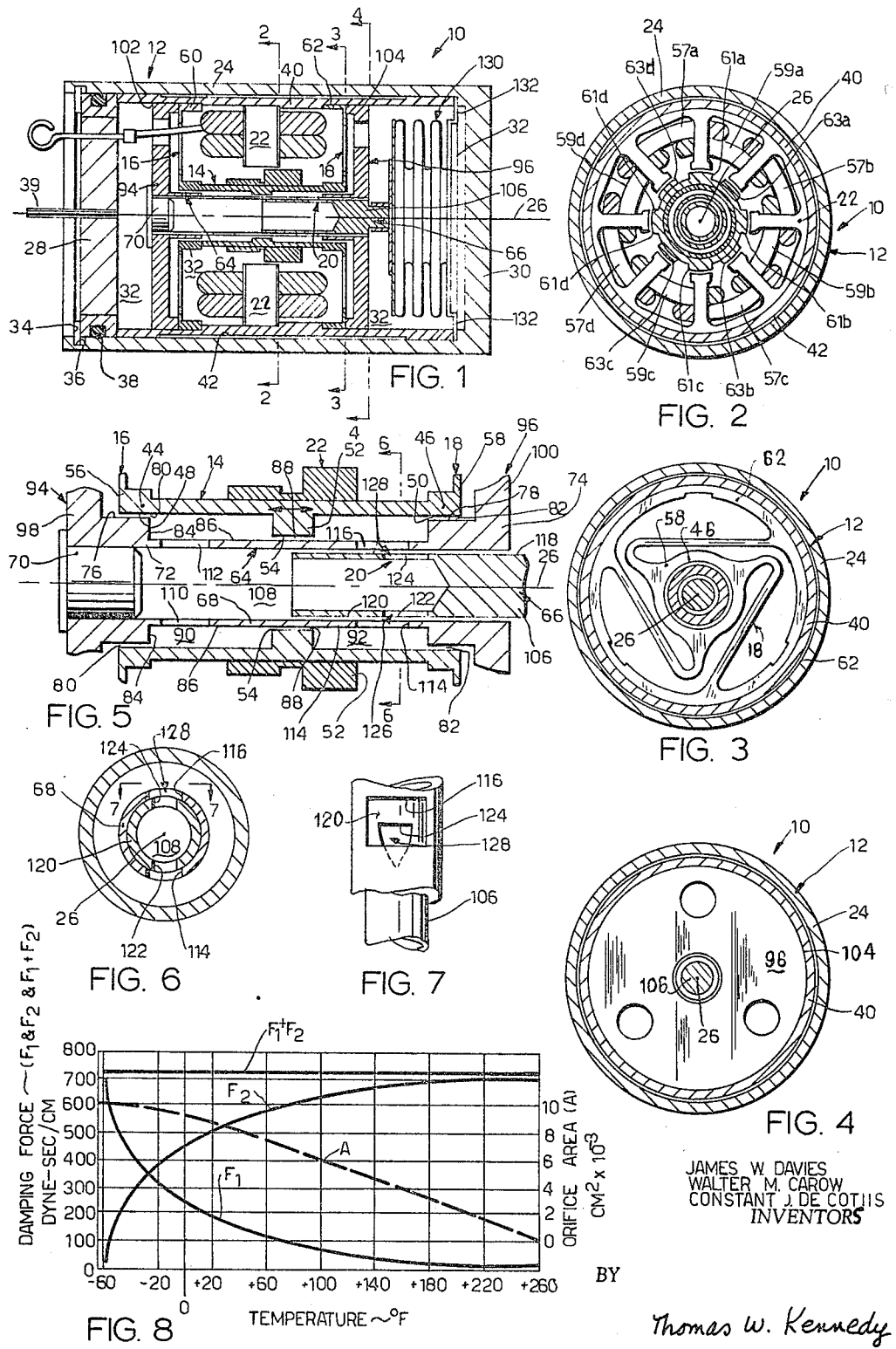

3,283,586
ACCELEROMETER DAMPING CONTROL
James W. Davies, Wayne, Walter M. Carow, West Caldwell, and Constant J. De Cotiis, Cranford, N.J., assignors to General Precision Inc., Little Falls, N.J., a corporation of Delaware
Filed June 24, 1964, Ser. No. 377,733
8 Claims. (Cl. 73—497)

The present invention relates to linear accelerometers, and particularly to fluid-damped linear accelerometers.

Prior art, fluid-damped, linear accelerometers have heaters to heat the damping fluid and to maintain a substantially constant fluid temperature and, therefore, viscosity, in order to provide a substantially constant damping force. If the heater can be eliminated from this type of accelerometer, and if the accelerometer can still maintain a substantially constant damping force with changing fluid temperatures, important advantages result, such as cost savings, improved reliability and ease of manufacture.

Accordingly, it is one object of the invention to provide a heaterless accelerometer with fluid damping means, which provides uniform damping of the seismic mass under varying fluid temperatures.

It is another object of the invention to provide a viscous shear type of fluid damping of the seismic mass, particularly over the lower or colder portion of the expected temperature range of the damping fluid.

It is a further object of the invention to provide a fluid pressure type of damping of the seismic mass, particularly over the higher or hotter portion of the expected temperature range of the damping fluid.

To the fulfillment of these and other objects, the invention provides an accelerometer comprising a housing containing damping fluid, a cylinder disposed in the housing forming a major portion of the accelerometer seismic mass, spring means disposed in the housing and supporting the cylinder from the housing for axial displacement of the cylinder relative to the housing, and a piston disposed in the cylinder connecting to the housing. The piston and cylinder have adjacent portions separated by continuous gaps containing damping fluid, which causes viscous shear damping of the cylinder. The adjacent portions of the piston and cylinder also form two variable-volume chambers containing damping fluid, which causes fluid pressure damping of the cylinder during displacement. This piston also has a passage interconnecting the chambers and a temperature-sensitive valve means, which is disposed in the passage, for regulating flow of damping fluid between the chambers thereby providing a uniform damping under varying temperatures.

Other objects of the invention will become apparent upon reading the annexed detail description in connection with the drawings wherein like parts are designated by like numerals throughout the several views, and wherein:

FIG. 1 is a sectional view of a linear accelerometer embodying features of the present invention;
FIG. 2 is a sectional view along line 2—2 of FIG. 1 looking in the direction of the arrows;
FIG. 3 is a sectional view along line 3—3 of FIG. 1;
FIG. 4 is a sectional view along line 4—4 of FIG. 1;
FIG. 5 is an enlarged portion of FIG. 1;
FIG. 6 is a sectional view along line 6—6 of FIG. 5;
FIG. 7 is a sectional view along line 7—7 of FIG. 6; and
FIG. 8 is a graph of damping forces and orifice area vs. temperature.

Referring to FIG. 1, one embodiment of the present invention is an accelerometer 10, which is a fluid-damped, single axis or linear type of accelerometer, comprising a housing 12 containing damping fluid, a cylinder 14 submerged in the fluid to function as the seismic mass of the accelerometer subject to displacement by acceleration forces. Accelerometer 10 also comprises springs 16, 18 supporting cylinder 14 from housing 12 and permitting linear displacement relative thereto, and comprises a fluid damping means 20 to provide constant damping forces under varying fluid temperatures. Accelerometer 10 also has a pickoff mechanism 22 to sense said displacements of the seismic mass.

United States Patent No. 3,126,746, which is assigned to the same assignee as the present invention, describes another type of linear accelerometer with electromganetic damping means, which has respective parts similar to housing 12, cylinder 14, springs 16, 18 and pickoff mechanism 22 of embodiment 10.

Housing 12, which is cylindrical in shape, is formed by a peripheral wall 24, with a longitudinal axis 26, and two axially-spaced end walls 28, 30 coacting to enclose a cylindrical cavity 32. End wall 30 is integrally joined to peripheral wall 24 at one end; the other end wall 28 is removably connected to the other end of peripheral wall 24 and held in place by an expansible spring retainer or snap ring 34 received in a groove 36 in wall 24. End wall 28 also has a peripheral seal ring 38 in sealing engagement with the radially-inner facing surface of wall 24 adjacent thereto, thereby minimizing leakage from cavity 32 of damping fluid. End wall 28 also has a fixed coaxial tube 39 through which damping fluid can be pumped into cavity 32 and which can be sealed thereafter with the fluid trapped in the cavity under positive pressure. Housing 12, hereinafter referred to as the outer housing, contains an inner housing 40.

Inner housing 40, which is a cylindrical, thin-shell liner, is fixedly connected and fitted within outer housing 12 to facilitate the assembly of the various components of accelerometer 10 within the outer housing as described hereafter. Inner housing 40 has a radially-outer surface 42 with an outside diameter which is slightly less than the inside diameter of outer housing wall 24. Housing 40 is coaxial with wall 24 along axis 26 and encloses cylinder 14, springs 16 and 18, damping means 20, and pickoff 22.

Cylinder 14, which is a hollow, fluid-filled cylinder, is coaxial with housings 12, 40 along axis 26 and has opposite end portions 44, 46 respectively connecting to springs 16, 18. Ends 44, 46 have respective radially-inner surfaces 48, 50, preferably of equal inner diameter. Cylinder 14 has a radially-inner, integral annular shoulder or ring 52 disposed axially midway between ends 44 and 46 and projecting in a radially-inward direction. Ring 52 has a radially-inner surface 54 with an inside diameter which is less than the inside diameters of surfaces 48 and 50.

Springs 16 and 18 (FIGS. 1, 3) are a conventional type of spring used in linear accelerometers, sometimes called geophysical, non-pendulous, plate, or spider springs. Springs 16 and 18 have respective radially-inner portions 56, 58 fixedly connected to cylinder ends 44, 46, and also have respective circular outer edges 60, 62 fixedly connected to adjacent, axially-spaced, circular portions of housing 40. Springs 16, 18 permit substantially unrestricted axial displacements of cylinder 14 along axis 26, but substantially restrict transverse displacements of said cylinder.

Pickoff 22 may be any suitable type. Pickoff 22 preferably has stator primary coils 57a, 57b, 57c, 57d (FIG. 2), and stator secondary coils 59a, 59b, 59c, 59d, fixedly connected to housing 40. Pickoff 22 (FIGS. 1, 2) also has two axially-spaced armature sections respectively having armature poles 61a, 61b, 61c, 61d and armature poles 63a, 63b, 63c, 63d, which are fixedly mounted on cylinder 14 to form a portion of the accelerometer seismic mass and which are arranged to sense the axial displacement of cylinder 14 relative to housings 12, 40. For further description of pickoff 22, reference is made to U.S. Patents Nos. 2,870,422 and 3,126,746, which describe accelerometers with similar pickoff mechanisms.

Damping means 20 has a stationary, piston-like damping tube 64 (FIG. 5), which is disposed with clearance inside cylinder 14 coaxially therewith along axis 26, and which is fixedly supported by housing 40. Damping means 20 also has a valve means 66 slidingly fitted inside tube 64 coaxially therewith along axis 26.

Tube 64 has a cylindrical wall 68 with a fixed end wall or plug 70 closing one end thereof. Wall 68 has end portions 72, 74 (FIG. 5) with respective radially-outer surfaces 76, 78, which are separated by gaps 80, 82 from respective surfaces 48, 50. Wall 68 also has an annular recess or groove 84 disposed midway between its ends 72 and 74 with a radially-outer surface 86 at the bottom of groove 84, which is separated by gap 88 from ring surface 54. Gaps 80, 82, 88 preferably have a sufficiently small thickness or size to provide a reasonable amount of viscous shear. For example, in one actual construction of this embodiment 10, each gap was 0.002 inch thickness.

Groove 84, which is substantially wider in an axial direction than ring 52, receives ring 52 forming two annular, variable-volume, axially spaced chambers 90 and 92. Chambers 90, 92 vary oppositely in volume with an axial displacement of cylinder 14 relative to tube 64. When a chamber 90 or 92 contracts in volume, fluid is forced simultaneously through two leakage paths to the opposite chamber 92 or 90. One leakage path is through gap 88. The other leakage path is through gap 80 or 82 around the exterior of cylinder 14, then through gap 82 or 80 to the other chamber 92 or 90.

Wall 68 has flanges 94, 96 (FIGS. 4, 5) disposed respectively adjacent its ends 72 and 74 for supporting tube 64 from housing 40. Flanges 94, 96 have respective radially-inner portions 98, 100, which are integrally joined to respective ends 72, 74 of wall 68, and have respective circular outer edges 102, 104 which are fixedly connected to adjacent axially spaced portions of housing 40. Flanges 94, 96 are disposed on the axially outer sides of springs 16, 18 and are axially spaced therefrom. Flanges 94, 96 preferably have a rigid construction to minimize any displacement of tube 64 relative to housings 12 and 40.

Valve means 66 has a plunger 106 slidingly fitted within end 74 of wall 68 forming a movable end wall on tube 64. Wall 68, plug 70 and plunger 106 form an elongate cavity or passage 108 inside tube 64 for interconnecting chambers 90, 92. Wall 68 has diametrically opposite openings 110, 112 extending radially therethrough from passage 108 into chamber 90. Wall 68 also has diametrically opposite openings 114, 116 extending therethrough from passage 108 into chamber 92.

Plunger 106, which is axially displaceable relative to wall 68, has a radially-outer surface 118, which is in sealing engagement with the inner surface of end portion 74 to minimize leakage from passage 108. Plunger 106 has a coaxial sleeve 120 projecting in an axially-inward direction, which has slots 122, 124 with a tapering-width profile, that are disposed respectively adjacent to openings 114, 116. Slots 122, 124 have portions overlapping respective portions of their adjacent openings 114, 116 forming pass-through apertures 126, 128, which have an orifice effect. Apertures 126, 128 vary in cross-sectional orifice area with the axial displacement of sleeve 120 thereby regulating and throttling the fluid flow through passage 108.

Plunger 106 also has a coaxial spring means or bellows 130, which has a flange 132 on its radially-outer side that is fixedly mounted on wall 24. Bellows 130 expands and contracts with the volume of damping fluid in housing 12 which changes with fluid temperature. Bellows 130 displaces plunger 106 and changes the orifice areas of apertures 126, 128 with varying fluid temperature. For example, when the temperature rises, bellows 130 (FIG. 1) contracts, plunger 106 (FIG. 5) moves to the right and apertures 126, 128 (FIG. 7) decrease in orifice area.

For ease of illustration, FIG. 7 shows apertures 126, 128 as about two-thirds open. The orifice area curve of FIG. 8 as explained hereafter, shows that apertures 126, 128 are fully closed at plus 260° F. and are fully opened at minus 60° F. Apertures 126, 128 (FIG. 7) at two-thirds open correspond to a temperature of about plus 100° F. (FIG. 8).

With this construction, damping fluid in gaps 80, 82, 88 can provide a viscous shear type of damping force on cylinder 14 resisting relative displacement between cylinder 14 and housings 12, 40. Moreover, damping fluid in chambers 90, 92 can provide a fluid pressure type of damping force on cylinder 14 resisting relative displacement. Thus, the construction of damping tube 64 combines the advantages of the two types of damping, that is, the effectiveness of the viscous shear damping over the colder portion and the effectiveness of the fluid pressure damping over the hotter portion of the range of the fluid temperature. In addition, valve means 66 can regulate the fluid pressure type of damping thereby providing a uniform total damping force with varying temperatures.

FIG. 8 includes test and calculation data for one sample of embodiment 10. Curve $F_1$ represents the viscous shear damping force. Curve $F_2$ represents the fluid pressure damping force. Curve $F_1$ plus $F_2$ represents the sum of the viscous shear and fluid pressure damping forces combined. Curve A represents the area of the apertures or orifice openings 126, 128. Said four curves are plotted against fluid temperature. In FIG. 8, curve $F_1$ indicates that the viscous shear type of damping is more effective over the colder portion of the fluid temperature range. Curve $F_2$ indicates that the fluid pressure type of damping is more effective over the hotter portion of the fluid temperature range. Curve $F_1$ plus $F_2$ indicates that the combination of the two types of damping can provide a uniform or constant total damping force with varying temperature.

The formula for curve $F_1$ is as follows:

$$F_1 = \frac{K_s u_t A_s}{G}$$

where:

$F_1$ = viscous shear damping force.
$K_s$ = a constant.
$u_t$ = viscosity constant at a particular temperature.
$A_s$ = surface area in viscous shear.
$G$ = gap, which is preferably about 0.002 inch to 0.004 inch.

Curve $F_1$ applies to a single sample of embodiment 10 in which the sizes of each of the gaps is 0.002 inch. It is obvious that curve $F_1$ is critically affected by a slight change in the gap size. For example, if the gap is increased from 0.002 inch to 0.004 inch, the viscous shear is reduced one-half at each temperature. The choice of gap size is largely determined by the desired viscous shear curve $F_1$ and by the desired manufacturing tolerances on tube 64 and cylinder 14.

Curve $F_2$ and curve $F_1$ plus $F_2$ can be obtained as follows:

(1) Calculate curve $F_1$ for the temperature range by the aforementioned formula.
(2) Select the highest damping force on curve $F_1$ at the lowest temperature; for example, force of 700 at a temperature of minus 60° F. (FIG. 8).
(3) Select the lowest damping force on curve $F_1$ at the highest temperature; for example, force of 20 at a temperature of plus 260° F. (FIG. 8).

(4) Calculate curve $F_1$ plus $F_2$ as a constant total force equal to the sum of the lowest and the highest damping forces on the curve $F_1$; for example, add the forces found in Steps 2 and 3, that is, force of 700 plus force of 20 equals force of 720 (FIG. 8).

(5) Calculate curve $F_2$ as the difference between curve $F_1$ plus $F_2$ and curve $F_1$; for example, at temperature 100° F., $F_1$ plus $F_2$ value of 720 less $F_1$ value of 50 equals $F_2$ value of 670 (FIG. 8).

The formula for curve A is as follows:

$$A = \frac{K_1}{C_d}\left[\frac{1}{(1+.07u_t)u_h} - \frac{1}{u_t}\right]\sqrt{\frac{v_0(F_2+K_2u_t)}{A_p}}$$

where:

$K_1$ = a constant depending on the density of the fluid, and the areas of the fluid paths or the sizes of the gaps.
$C_d$ = orifice discharge coefficient.
$u_t$ = viscosity of fluid at particular temperature of the calculation.
$u_h$ = viscosity of fluid at the hot end of the temperature range or the highest temperature.
$v_0$ = velocity of piston.
$F_2$ = damping force required at the particular temperature of the calculation.
$K_2$ = a constant.
$A_p$ = area of piston, which equals a constant.
$A$ = area of orifice for the constant damping force.

In the above formula for curve A, it can be observed that all values are constant, except $u_t$ and $F_2$; and in the formula for curve $F_1$, it can be observed that all values are constant except $u_t$. Thus, curve A is a direct function of curve $F_1$ and curve $F_2$. The formula for curve A is derivable using conventional hydraulic principles.

The aformentioned formulas are the basis of the design of damping means 20 in embodiment 10. The characteristics of one actual construction of embodiment 10 are plotted in the curves of FIG. 8, which graphically summarize these formulas.

In summary, embodiment 10 provides the optimum amount of viscous shear damping at varying fluid temperatures, consistent with normal manufacturing tolerances and consistent with the use of a conventional, variable-viscosity damping fluid. Embodiment 10 also provides a supplementary amount of fluid pressure damping at said varying temperatures thereby maintaining a substantially constant damping force over an extremely broad range of temperatures.

While the present invention has been described in a preferred embodiment, it will be obvious to those skilled in the art that various modifications can be made therein within the scope of the invention; and it is intended that the appended claims cover all such modifications.

What is claimed is:

1. An accelerometer comprising:
   a housing containing damping fluid;
   a cylinder disposed in said housing forming a major portion of the accelerometer seismic mass;
   spring means disposed in said housing and supporting the cylinder from said housing for axial displacement of the cylinder relative to the housing;
   a piston disposed in the cylinder and connecting to the housing;
   said piston and cylinder having axially-spaced, radially-projecting peripheral wall portions with confronting surfaces separated by gaps causing viscous shear damping and forming two chambers varying oppositely in volume providing fluid pressure damping;
   said piston having a passage interconnecting said chambers;
   temperature-sensitive valve means disposed in said piston passage providing uniform damping under varying temperatures; and
   said piston having two annular peripheral wall portions forming an annular groove therebetween, and said cylinder having an annular wall portion received in said annular groove forming said two chambers.

2. An accelerometer as claimed in claim 1, in which said piston has a cylindrical tubular wall with axially spaced openings forming respective ports from said passage into said chambers, and has an integral end wall closing one end of said tubular wall, and has a plunger wall slidingly fitted in the other end of said tubular wall.

3. An accelerometer as claimed in claim 2, in which said plunger wall has a sleeve projecting in an axially-inward direction and sealingly engaging said tubular wall, and sleeve having slots respectively overlapping adjacent chamber openings forming apertures with orifice openings varying with the axial displacement of said plunger relative to said tubular wall.

4. An accelerometer comprising:
   a housing containing damping fluid;
   a cylinder disposed in said housing forming a major portion of the accelerometer seismic mass;
   spring means disposed in said housing and supporting the cylinder from said housing for axial displacement of the cylinder relative to the housing;
   a piston disposed in the cylinder and connecting to the housing;
   said piston and cylinder having axially-spaced, radially-projecting peripheral wall portions with confronting surfaces separated by gaps causing viscous shear damping and forming two chambers varying oppositely in volume providing fluid pressure damping;
   said piston having a passage interconnecting said chambers;
   temperature-sensitive valve means disposed in said piston passage providing uniform damping under varying temperatures; and
   said valve means having a temperature-sensitive spring means for regulating flow of damping fluid through said valve.

5. An accelerometer as claimed in claim 4, in which said spring means is a bellows mounted on said housing.

6. An accelerometer as claimed in claim 4, in which each said gap between the piston and the cylinder has a gap thickness not less than 0.001 inch and not more than 0.006 inch.

7. An accelerometer as claimed in claim 4, including a pick-off means mounted on the housing for sensing the axial displacement of said cylinder relative thereto.

8. A floated type of single axis, linear accelerometer comprising:
   a housing containing damping fluid;
   a cylinder disposed in said housing along a common axis forming a major portion of the accelerometer seismic mass;
   a pair of axially-spaced geophysical springs mounted within said housing and supporting the cylinder from said housing for axial displacement of the cylinder relative to the housing;
   a piston having one end portion disposed in the cylinder coaxial with the cylinder and the housing and having an opposite end portion connecting to the housing;
   said piston having a tubular peripheral wall with two annular peripheral wall portions projecting in a radially-outward direction forming an annular groove therebetween;
   said cylinder having a ring-like annular wall portion projecting in a radially-inward direction and received within said groove forming two chambers varying oppositely in volume during said displacement of the cylinder relative to the housing and containing damping fluid providing fluid pressure damping of said cylinder;
   said piston and cylinder having confronting surfaces adjacent to their radially-projecting wall portions separated by gaps containing damping fluid causing viscous shear damping of said cylinder;

said piston having an integral end wall closing one end of its tubular peripheral wall and having a plunger wall slidingly fitted in the other end of its tubular peripheral wall forming a passage interconnecting the two chambers with axially-spaced openings through said tubular peripheral wall forming respective ports from said passage into said chambers;

said plunger wall having a sleeve projecting in an axially-inward direction and sealingly engaging the adjacent portion of said tubular peripheral wall, said sleeve having slots respectively overlapping the adjacent chamber openings forming apertures with orifice openings varying with the axial displacement of said plunger relative to said tubular wall for regulating the flow of damping fluid between said chambers thereby providing uniform damping under varying temperatures;

a bellows submerged in the damping fluid within said housing and disposed coaxial with the plunger on the axially-outer side of the plunger and said bellows having an axially-inner side connecting to the plunger and having a peripheral flange with a radially-outer edge connecting to the housing for regulating the sizes of said orifice openings according to the temperature-controlled volume and viscosity of the damping fluid; and a pickoff means mounted within the housing for sensing the axial displacement of said cylinder relative to said housing.

References Cited by the Examiner

UNITED STATES PATENTS

| 2,332,994 | 10/1943 | Draper et al. | 73—497 |
| 3,052,858 | 9/1962 | Darlington. | |
| 3,137,175 | 6/1964 | Jamgochian | 73—503 |

FOREIGN PATENTS 764,388  12/1956  Great Britain.

RICHARD C. QUEISSER, *Primary Examiner.*

JAMES J. GILL, *Examiner.*